United States Patent
Barfoot et al.

(10) Patent No.: US 8,260,483 B2
(45) Date of Patent: Sep. 4, 2012

(54) GUIDANCE, NAVIGATION, AND CONTROL SYSTEM FOR A VEHICLE

(75) Inventors: Timothy D. Barfoot, Toronto (CA); Joshua A. Marshall, Bolton (CA); Raja Mukherji, Brampton (CA); Robert Ward, Aurora (CA)

(73) Assignee: MacDonald, Dettwiler & Associates Inc, Brampton, ON (CA)

( * ) Notice: Subject to any disclaimer, the term of this patent is extended or adjusted under 35 U.S.C. 154(b) by 0 days.

(21) Appl. No.: 13/209,247

(22) Filed: Aug. 12, 2011

(65) Prior Publication Data

US 2012/0035798 A1    Feb. 9, 2012

Related U.S. Application Data

(62) Division of application No. 11/922,706, filed as application No. PCT/CA2006/001261 on Jul. 26, 2006, now Pat. No. 8,090,491.

(60) Provisional application No. 60/702,285, filed on Jul. 26, 2005.

(51) Int. Cl.
*G01C 22/00* (2006.01)

(52) U.S. Cl. ......... 701/23; 701/33.7; 701/41; 701/48; 701/79; 701/93; 701/110; 701/408; 700/302; 700/304; 700/253; 180/116; 180/167; 180/168; 180/169; 318/580; 318/587

(58) Field of Classification Search ............ 701/23, 701/33.7, 41, 48, 79, 110, 408; 700/253, 700/302, 304

See application file for complete search history.

(56) References Cited

U.S. PATENT DOCUMENTS

| | | | |
|---|---|---|---|
| 4,790,402 A | 12/1988 | Field et al. | |
| 4,809,178 A | 2/1989 | Ninomiya et al. | |
| 5,155,684 A | 10/1992 | Burke et al. | |
| 5,530,330 A | 6/1996 | Baiden et al. | |
| 5,999,865 A * | 12/1999 | Bloomquist et al. | 701/25 |
| 6,314,341 B1 | 11/2001 | Kanayama | |
| 6,349,249 B1 * | 2/2002 | Cunningham | 701/28 |
| 6,633,800 B1 * | 10/2003 | Ward et al. | 701/2 |
| 6,694,233 B1 | 2/2004 | Duff et al. | |
| 2004/0167688 A1 | 8/2004 | Karlsson | |

FOREIGN PATENT DOCUMENTS

| | | |
|---|---|---|
| WO | 02/093282 | 11/2002 |
| WO | 2005/003808 | 1/2005 |

* cited by examiner

*Primary Examiner* — Redhwan k Mawari
(74) *Attorney, Agent, or Firm* — Hill & Schumacher; Lynn Schumacher (57) ABSTRACT

The present invention provides a guidance, navigation, and control method and system for an underground mining vehicle that allow said vehicle to be taught a route by a human operator and then have it automatically drive the route with no human intervention. The method works in three steps: teaching, route profiling, and playback. In the teaching step the vehicle is manually driven by a operator along a route which can consist of an arbitrary sequence of maneuvers including tramming forwards, switching directions, tramming backwards, turning, or pausing movement. During this phase raw data from vehicle-mounted sensors including odometric sensors and rangefinders are logged to a file throughout teaching for later processing. During the (offline) route profiling step, the raw data in the log file are processed into a route profile, and a profile of desired speed as a function of distance along the path.

16 Claims, 6 Drawing Sheets

GUIDANCE, NAVIGATION, AND CONTROL SYSTEM FOR A VEHICLE

CROSS REFERENCE TO RELATED APPLICATIONS

This patent application is a Divisional application of U.S. patent application Ser. No. 11/922,706, which is a National Phase application claiming the benefit of PCT/CA2006/001261 filed on Jul. 26, 2006; which further claims the priority benefit from, U.S. Provisional Patent Application Ser. No. 60/702,285 filed on Jul. 26, 2005, in English, entitled GUIDANCE, NAVIGATION, AND CONTROL SYSTEM FOR A VEHICLE, which is incorporated herein by reference in its entirety.

BACKGROUND OF THE INVENTION

1. Field of the Invention

The present invention is related to guidance, navigation, and control methods for a vehicle that allows the vehicle to be taught a route by a human operator (either manually or through tele-operation) and then have it automatically drive the route with no human intervention.

2. Brief Description of the Related Art

Underground mining is a complex operation whose goal is to extract as much resource as possible at the lowest possible cost. For example, in many mines, a network of rooms and pillars is carved out to maximize the amount of extracted ore while maintaining adequate roof support in order to avoid cave-ins.

Conventional mining techniques call for vehicles to haul loads of ore through underground passageways from the currently active section of the mine to the extraction point. Load-haul-dump vehicles scoop up several tons of ore and drive this to a common dump location. Sometimes the ore loads are dumped into larger haul trucks and driven along a main passageway to the surface. As mining progresses, the transport vehicles are required to travel ever longer distances to pick up the ore and bring it back. These transport vehicles must travel the same route many times and for the most part, this is done manually, either with a driver on the vehicle or more recently through tele-operation. Driver safety, operator fatigue, labour costs, and the cyclic nature of this task are all motivations to seek a solution to automate the process of driving these transport vehicles back and forth between the pick up and drop off points. Moreover, from a cost perspective, it would be advantageous to be able to accomplish this automation with requiring that infrastructure be installed throughout the mine, but rather by limiting the technology to the addition of equipment to the vehicles themselves and equipment associated with safety measures. If reliable methods can be developed to automate the entire load-haul-dump sequence it will have an overall positive effect on mine safety and productivity. In the present invention the inventors are concerned only with methods for automating the hauling (or tramming) process, not loading/dumping. In the present invention the term "autotram" will refer to automated tramming or hauling. One of the key challenges of autotramming is that the global positioning system (GPS) is not available underground and thus the automation solution cannot rely on having good positioning information provided from this (external) system.

The earliest implementations of autotram borrowed ideas from automated-guided-vehicles by outfitting the mine with tracks, magnetic strips, or light-ropes that could be used to allow a vehicle to find its way down the passageways. Although these solutions were partially successful, installing the track/strip/light-rope infrastructure was very expensive and it was highly onerous to change the route as the infrastructure had to be altered. U.S. Pat. No. 5,530,330 issued to Baiden et al., for example, discloses a tramming system wherein the vehicle follows a light-rope installed along the passageway. It became clear over time that systems that could enable autotramming without infrastructure would be much cheaper to produce and maintain. U.S. Pat. No. 5,999,865 issued to Bloomquist et al. discloses an autonomous vehicle guidance system that could be used to guide a self-propelled vehicle through passageways without infrastructure. It specifically considers self-propelled mining equipment in underground passageways. The system disclosed is comprised of a signal generator for bouncing signals off walls, a receiver for receiving the return signals and determining the distance to the side walls of the passageway, a storage device containing a set of interlinking nodes that represent at least one path through the passageway environment (each node contains steering information), and a processor to compare the side wall distances and steer the vehicle according to the steering information in the interlinking nodes.

The set of interlinking nodes is described as representing the topology of the passageway environment (e.g., straight, dead end, left corner, four-way intersection). The links indicate the connections between various passageway sections. Hence, the steering information that is said to be contained in the interlinking nodes is discrete in that it only directs the vehicle at a high-level whether to go straight, turn left, or turn right at each intersection. The lower-level task of steering to avoid hitting the walls is left to a reactive scheme that tries to center the vehicle in the passageway based on the distances to the side walls determined by the receiver. It should also be noted that no metric information about the path (e.g., distances to various wall points or a local metric submap wherein the notion of distance is defined) is contained in the route representation, only the topology of the passageway. In mobile robotics research, systems similar to this that rely entirely on classifying tunnel topology to navigate have been shown to not operate robustly due to inevitable misclassifications that occur in practice. Other disadvantages of the disclosed system include: it does not discuss how the vehicle speed will be controlled, it does not explain how to account for vehicle dynamics (e.g., vehicle inertia, hydraulic steering, and engine dynamics) when controlling the steering and speed, and it does not claim a teaching method for creating the graph that represents the layout of the passageway environment. Furthermore, much discussion is devoted to the higher-level functions of path-planning and traffic management, which are beyond the scope of the current application.

U.S. Pat. No. 6,694,233 issued to Duff et al. discloses a system for relative vehicle navigation. The patent has three independent claims relating to localizing a vehicle without infrastructure, guiding a vehicle along a route without infrastructure, and a type of nodal map that can be used for localizing without infrastructure. The patent clearly defines a nodal map as a topological representation of a walled (i.e., passageway) environment. No metric information (e.g., local metric submap) is contained in the nodal map structure. As discussed above, systems similar to this that rely entirely on classifying tunnel topology to navigate have been shown to not operate robustly due to inevitable misclassifications of topology that occur in practice. The method for guiding the vehicle describes a specific approach using active contours, or snakes, to automatically generate a path for the vehicle on-the-fly. This on-the-fly path-planning is beyond the scope of the current application.

World Intellectual Property Organization Patent No. 2004/085968 issued to Makela discloses a method and control system for positioning a mine vehicle. The patent claims a method of counting the number of wheel revolutions and multiplying by a factor to obtain the distance traveled by the vehicle. It also claims a means of correcting the multiplication factor when the diameter of the wheel changes, which is beyond the scope of the current application.

Based on the drawbacks related to navigating from a topological map, the current invention is comprised of an alternative system to guide, navigate, and control a mining vehicle operating in an underground passageway environment based on a geometric map representation. This system can help enable the overall goal of robust and reliable mine automation.

SUMMARY OF THE INVENTION

The present invention provides an automation system for the problem of driving a transport vehicle through an underground mining environment. The system makes use of an on-board computer with a memory to which vehicle-mounted odometric sensors and rangefinder sensors are connected. In one aspect of the invention there is provided a method for automating the operation of a self-propelled vehicle in a passageway environment, the vehicle including one or more odometric sensors, one or more rangefinder sensors mounted on said vehicle, and a microprocessor including memory storage, said one or more odometric sensors and one or more rangefinder sensors being connected to said microprocessor, said vehicle being configured for microprocessor controlled operation with said microprocessor being interfaced with the vehicle's throttle/engine system, transmission system, braking system, and steering system, said method including the steps of: a) teaching said vehicle a route through said passageway environment by the steps of, i) conducting a training run of said route through said passageway environment by driving said vehicle through said passageway environment, and ii) acquiring raw sensor data from said one or more odometric sensors and said one or more rangefinder sensors during said training run of said route and storing said raw sensor data in a log file in said microprocessor memory storage; b) processing said raw sensor data contained in said log file and producing therefrom a route profile and storing said route profile in said microprocessor memory, said route profile including information representing i) a vehicle path through said passage environment, ii) a sequence of local metric submaps located along, and defined relative to, the vehicle path, said vehicle path being expressed in a frame of reference, and the local metric submaps being expressed relative to said vehicle path, and iii) a speed profile defined as a function of distance along the vehicle path; and c) automatically driving said vehicle along said route by the steps of, i) determining longitudinal, lateral, and heading errors of said vehicle with respect to the vehicle path by comparing said raw sensor data from said odometric sensors and said rangefinder sensors to said local metric submaps and said microprocessor using said longitudinal, lateral and heading errors and knowledge of said vehicle's dynamics to control said steering system to adjust a direction of travel of said vehicle if needed for ensuring said vehicle closely tracks said vehicle path stored in said route profile, ii) estimating a speed of said vehicle from data from said odometric sensors, and said microprocessor controlling said throttle/engine system, transmission system, and braking system to adjust speed of travel of said vehicle if needed for ensuring said vehicle closely tracks said speed profile stored in said route profile by using said estimated speed and knowledge of said vehicle's dynamics, and iii) detecting unexpected obstructions along said vehicle path using data from said one or more rangefinder sensors and in the event an unexpected obstruction is detected, said microprocessor instructing said vehicle to stop. The present invention also provides a self-propelled vehicle with a guidance, navigation and control system for automated operation in a passageway environment, comprising: a) a vehicle including one or more odometric sensors, one or more rangefinder sensors mounted on said vehicle, and a microprocessor including memory storage, said one or more odometric sensors and one or more rangefinder sensors being connected to said microprocessor, said vehicle being configured for microprocessor controlled operation with said microprocessor being interfaced with the vehicle's throttle/engine system, transmission system, and braking system through a drive control means to adjust a speed of travel of said vehicle, and said microprocessor being interfaced to the vehicle's steering system through a steering control means to adjust a direction of travel of said vehicle; b) teaching means including i) means for conducting a training run of a route through said passageway environment by driving said vehicle through said passageway environment, and ii) data logging means to acquire raw sensor data from said one or more odometric sensors and said one or more rangefinder sensors during said training run of said route and storing said raw sensor data in a log file in said microprocessor memory storage; c) profiling means for processing said raw sensor data contained in said log file and producing therefrom a route profile and storing said route profile in said microprocessor memory, said route profile including information representing i) a vehicle path through said passage environment, ii) a sequence of local metric submaps located along, and defined relative to, the vehicle path, said vehicle path being expressed in a frame of reference, and the local metric submaps being expressed relative to said vehicle path, and iii) a speed profile defined as a function of distance along the vehicle path; and d) playback control system to automatically drive said vehicle along said route stored on said microprocessor memory comprising i) localization means for determining longitudinal, lateral, and heading errors of said vehicle with respect to the vehicle path by comparing said raw sensor data from said odometric sensors and said rangefinder sensors to said local metric submaps, said steering control means adjusting the direction of travel of said vehicle for ensuring said vehicle closely tracks said vehicle path stored in said route profile by using said lateral and heading errors and knowledge of said vehicle's dynamics, ii) speed estimation means for determining a speed of said vehicle from data from said odometric sensors, said drive control means adjusting the speed of travel of the vehicle for ensuring said vehicle closely tracks said speed profile stored in said route profile by using said estimated speed and knowledge of said vehicle's dynamics, and iii) said microprocessor instructing said vehicle to stop in the event of an emergency situation arising.

More particularly, the system is comprised of methods for a) teaching a route through a passageway environment and logging data from sensors to a memory, b) processing the logged data into a route profile (comprised of a vehicle path, a sequence of local metric submaps along the path, and a speed profile defined as a function of distance along the path), and c) playing back the profiled route automatically using a control system.

The purpose of the teaching method is to allow an operator to define the route to be subsequently played back. This could be done, for example, by having the operator manually drive the vehicle (e.g., manutram) or remotely drive the vehicle (e.g., tele-operation). A data logging system records information from odometric sensors (e.g., drive-shaft encoder and hinge-angle encoder) and rangefinder sensors (e.g., SICK Optic Laser Scanner) to a log file, which resides on the memory of the on-board computer. The profiling method is used to process the raw sensor data contained in the log file into a route profile which is comprised of a vehicle path, a sequence of local metric submaps located along and defined relative to the path, and a speed profile defined as a function of the distance along the path. The path itself is generated using the data from the odometric sensors and a kinematics model of the vehicle. The local submaps are generated using both the odometric sensor data and the rangefinder sensor data. The current application discloses a different method of representing a map of the passageway environment, using a sequence of local metric submaps, which better represents the raw shape of the passageways and can offer better vehicle localization in an unstructured passageway environment than other systems that use topological representations. And, although metric maps are used, it is a sequence of these maps attached along the vehicle's path that forms the overall route profile; which is to say, the system does not rely on one monolithic map and an absolute frame of reference. This approach is far more flexible than a system that must recognize tunnel topology in that it will work regardless of the shape of the walls, so long as the maps are of sufficient resolution. The speed profile is generated automatically to suit the particular vehicle path. For example, lower speeds are assigned to sections of the path with higher curvature such that during playback the vehicle will slow down in corners. The route profiling method could be executed using the on-board computer or the data log file could be moved to an off-board computer for processing and the resulting route profile file returned to the onboard computer memory for playback.

The playback method is used to automatically drive the vehicle along the route represented by the route profile. It is further comprised of a) a localization method to determine the longitudinal, lateral, and heading errors of said vehicle with respect to the path by comparing data from said odometric sensors and said rangefinder sensors to said local submaps stored in said route profile, b) a speed estimation method to determine the speed of said vehicle from said odometric sensors, c) a steering control method to ensure said vehicle closely tracks said path stored in said route profile by using said lateral and heading errors and knowledge of said vehicle's characteristic dynamics, d) a drive control method to ensure said vehicle closely tracks said speed profile stored in said route profile by using said speed estimation method and knowledge of said vehicle's dynamics, e) a safety method to detect unexpected obstructions along said path using said rangefinder sensor and to stop said vehicle.

The present invention uses a localization method which specifically estimates both orientation and position of vehicles with respect to the path.

The present localization method disclosed herein incorporates odometric sensors for dead-reckoning and rangefinder sensors for correcting said dead-reckoning using the local metric submaps located along the vehicle path in the route profile. Once the localization method completes its task of determining where the vehicle is along the path, how far it is to either side of the path, and how rotated it is with respect to the path, the steering control method determines how much the vehicle must steer to return to the path and sends the steering command to the vehicle. The speed of the vehicle is estimated and the drive control method compares this speed to the speed contained in the speed profile at the current position along the path to determine whether the vehicle should speed up or slow down. The drive commands are then sent to the vehicle. A safety method detects obstructions along the vehicle's path and stops the vehicle in such an eventuality. At the end of a route the vehicle stops. A further understanding of the functional and advantageous aspects of the invention can be realized by reference to the following detailed description and drawings.

BRIEF DESCRIPTION OF THE DRAWINGS

Preferred embodiments of the invention will now be described, by way of example only, with reference to drawings. Drawings are not necessarily to scale. For clarity and conciseness, certain features of the invention may be exaggerated and shown in schematic form.

DETAILED DESCRIPTION OF THE INVENTION

As used herein, the phrase "passageway environment" means any space where vehicles might travel that contains walls, barriers, or obstacles such that said vehicles must travel amongst these objects. Examples of passageway environments include streets among buildings, building hallways, office spaces, underground mines, tunnels, caves, etc. Herein, it is assumed that passageway environments can be represented by maps. As used herein, a "map" refers to a representation of a region of a passageway environment.

As used herein, the phrase "metric map" means a map in which the notion of distances between points on the map is defined.

As used herein, the phrase "topological map" means a map in which the notion of distances between points on the map is not defined.

As used herein, a "consistent map" refers to a map in which: a) no two (or more) points on the map represent the same point in the physical environment; b) no one point in the map represents two (or more) points in the physical environment; and c) if the map is a "metric map", the distance between any two points is approximately correct (but scaled) in the map.

As used herein, the phrases "local map" and "local submap" both mean a map of a particular region of an environment that is consistent in the region expressed by the map. As used herein, the phrase "local metric submap" means a metric map of a particular region of an environment that is consistent in the region expressed by the map.

As used herein, the phrase "global map" or "globally consistent map" both mean a map of an environment that is consistent in the region expressed by the map, but which may have been created by combining one or more local maps. Thus, a local map is a global map in the region it expresses.

As used herein, the phrase "range sensing device" means a device for accurately measuring the distance to targets within a certain viewing scope of the device. The distance measurements can be based on any of a number of principles, including time-of-flight, triangulation, phase difference, etc. A "scan" refers to a set of distance data collected from the range sensing device at a particular instance. The term "rangefinder" is sometimes used as a synonym to "range sensing device," and a "laser rangefinder" is a range sensing device that uses lasers and the time-of-flight principle to measure distance.

As used herein, the phrase "position and orientation" refers to an object's coordinates with respect to a fixed point together with its alignment (or bearing) with respect to a fixed axis. For example, the position and orientation of a vehicle in a passageway environment might be the coordinates of a point on the vehicle together with the bearing of the vehicle (e.g., in degrees). Sometimes the word "pose" is used as a short form for "position and orientation."

As used herein, the phrases "kinematics model" and "vehicle kinematics" typically refer to a model for the vehicle that considers only the rate of change of the vehicle's configuration. This is in contrast to a "dynamics model" or "vehicle dynamics," which typically consider the forces and resulting accelerations that describe the vehicle's motion. In the same way, the words "kinematics" and "dynamics" are also used to describe the characteristics of different models for individual vehicle components or subsystems, such as actuators.

As used herein, the phrase "inertial measurement unit" means a device that comprises both accelerometers, for measuring acceleration along perpendicular axes, and angular rate sensors (e.g., gyroscopes), for measuring the pitch, roll, and yaw rates of the body to which the sensors are affixed.

As used herein, the phrase "odometric sensor(s)" means a device used to estimate the position and orientation of a vehicle using "dead-reckoning". This dead-reckoned estimate is obtained by incrementally adding to a known initial position and orientation and can be based on data from one or more sensors, including data from an inertial measurement unit, optical encoders, toothed-gear and hall-effect sensor pairs, and a hinge-angle sensor. Moreover, this dead-reckoned estimate can use knowledge about the vehicle's kinematics to fuse data from the one or more odometric sensors.

Herein, the word "odometry" is sometimes used as a short form for "estimate of vehicle position and orientation using odometric sensors".

As used herein, the term "path" means a continuous set of points in a passageway environment that is traced out by a reference point on a vehicle during movement. Sometimes the term "route" is used as a synonym for "path".

Figure 1:
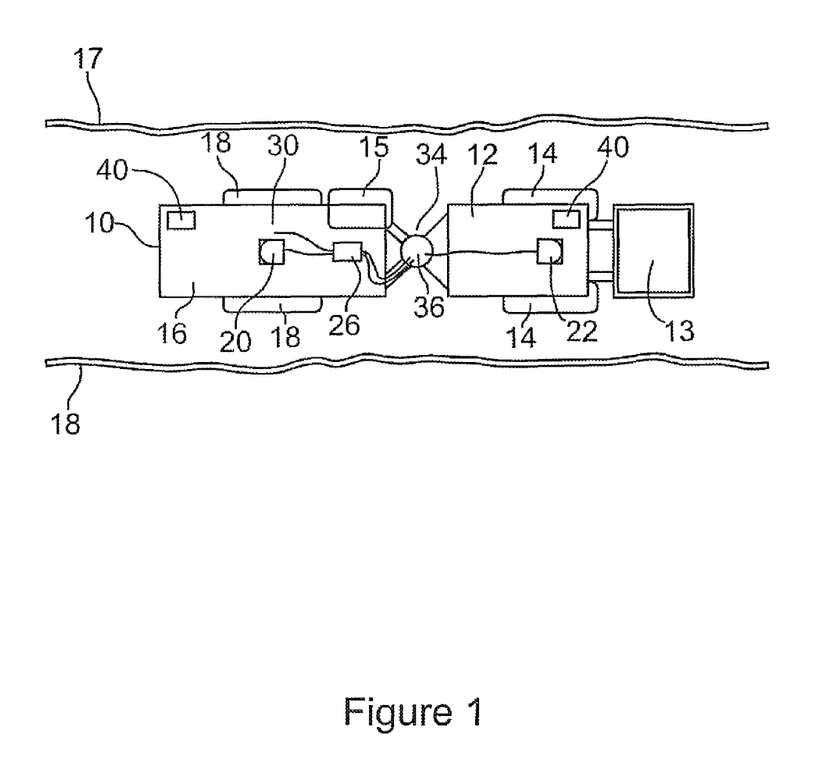
FIG. 1 shows a preferable configuration of the sensors on a schematic load-haul-dump mining vehicle.
Figure 2:
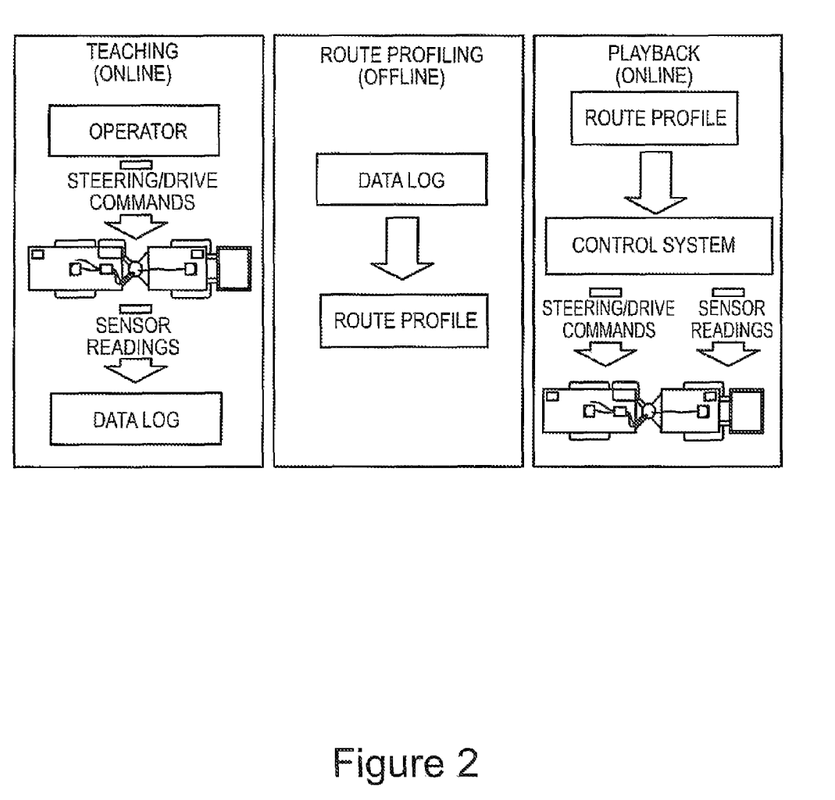
FIG. 2 shows the operational steps of teaching, route profiling, and playback.

The present invention provides an automation system for the problem of driving a vehicle 10 as depicted in FIG. 1 through an underground mining environment defined by mine walls 17 and 18. As depicted in FIG. 2, there are three main operational steps to the invention: teaching, route profiling, and playback. Teaching: The purpose of the teaching method is to define a route, for subsequent playback, by driving the vehicle along its intended path and recording sensor data. Referring to FIG. 1, a vehicle 10 for underground mining applications includes a front section 12 with wheels 14 and a rear section 16 having wheels 18, an operator cab 15 and a bucket 13 for carrying ore mounted to the front of front section 12. One or more rangefinder sensors (e.g., laser rangefinders), including for example a rangefinder 20 mounted in the rear vehicle section 16, and a rangefinder 22 mounted in front section 12 of vehicle 10, are used to generate a profile of ranges around vehicle 10. A computer processor 26 mounted on vehicle 10 is connected to rangefinders 20 and 22 for acquiring the range data from the rangefinders. The vehicle 10 includes one or more odometric sensors and may include for example wheel encoders 30 for measuring the rotation of the wheels 18. Wheels 14 of front vehicle section 12 may include wheel encoders as well (not shown). A hinge 34 connecting vehicle sections 12 and 16 may include steering sensors 36. Inertial measurement units may also be incorporated into vehicle 10 and computer processor 26 is configured to acquire data from the various odometric sensors. Cameras 40 may be mounted on the vehicle for image acquisition for remote operation of vehicle 10 for example.

The vehicle 10 also optionally includes a radio receiver and computer processing means 26 may be configured to acquire information relating to radio frequency identification (RFID) tags as well to acquire information relating to communication infrastructure (e.g., signal strength to wireless Ethernet nodes). Vehicle 10 also preferably includes a capability to acquire information relating to the pitch/roll of the vehicle (e.g., from inclinometer sensors mounted on strategic parts of the vehicle), transmission gear of the vehicle, engine speed of the vehicle, and if present, pressures in any hydraulic cylinders required to steer the vehicle 10, and a means to determine the acquisition times of all the aforementioned data and store them in the onboard memory of said computer processor 26 in a log file.

Figure 3:
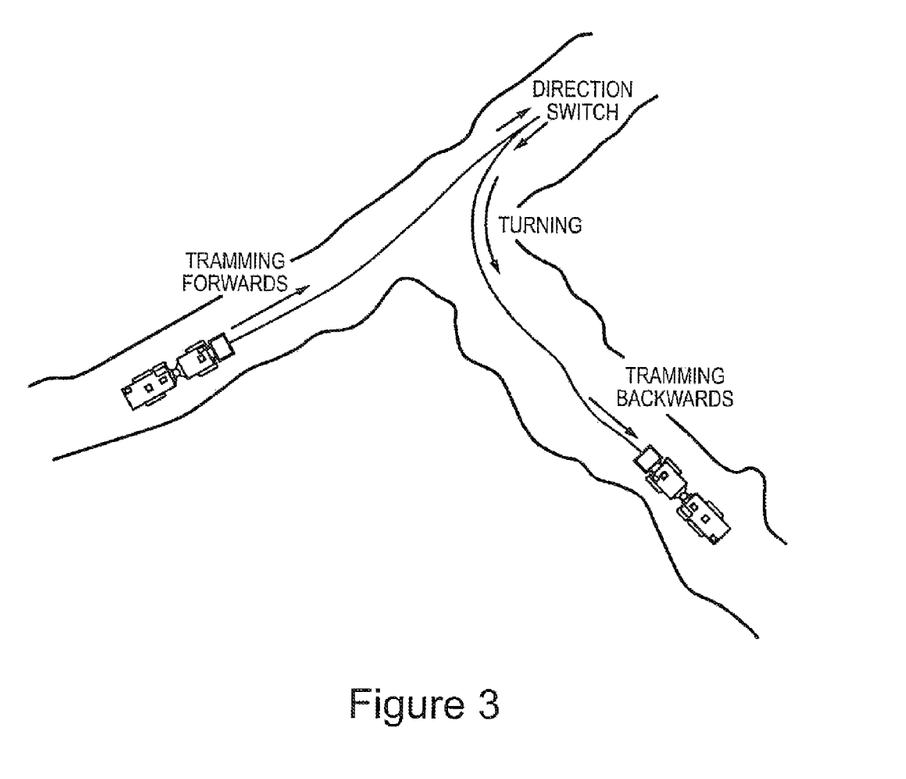
FIG. 3 shows the typical maneuvers involved in a route for a mining vehicle.
Figure 4:
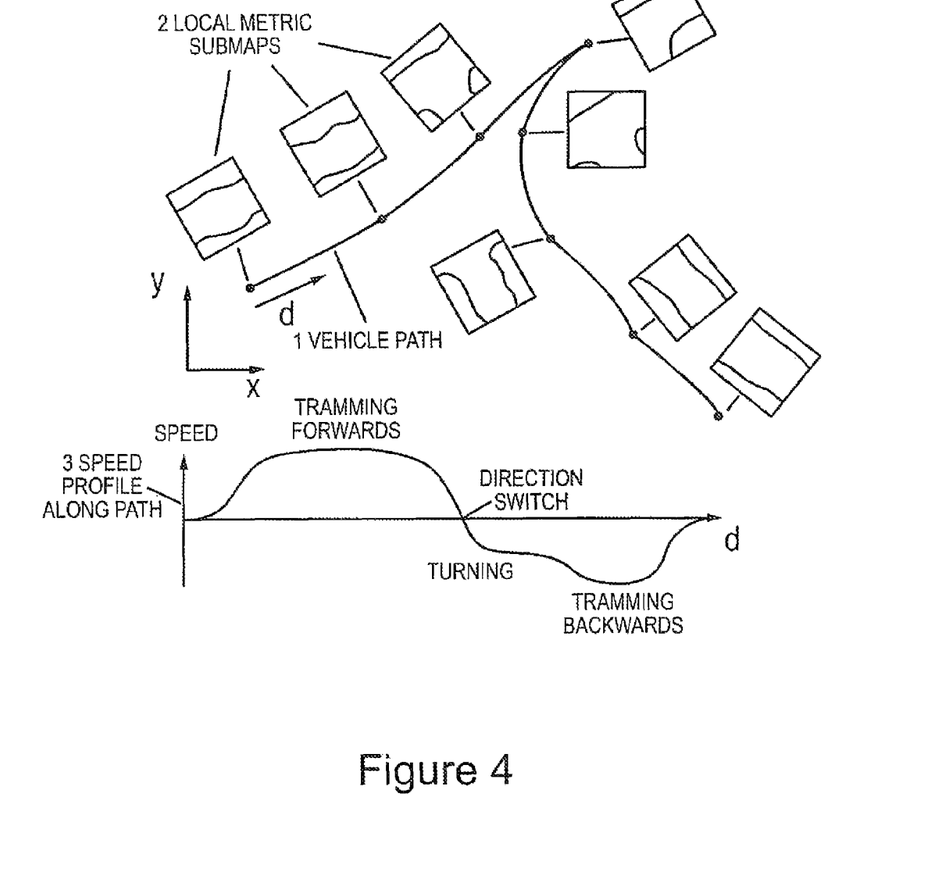
FIG. 4 provides an example of the information stored in a route profile.

As depicted in FIG. 3, a route can be comprised of a number of different maneuvers for the vehicle including: tramming forwards, tramming backwards, switching directions, turning, and pausing to carry out activities. A typical route will be between 30 meters and 3 kilometers in length but the present invention is not limited to any particular length of route. The route is defined by driving the vehicle 10 along it and logging all the available sensor data to a file. In one embodiment, the vehicle 10 could be driven manually, wherein an operator sits in the cab 15 of the vehicle (FIG. 1) and uses the vehicle's manual controls to operate the vehicle 10. In another embodiment, the operator could drive the vehicle remotely either by line-of-sight or tele-operation using cameras 40 mounted on the vehicle 10. Remote operation requires the use of remote controls, which could include the use of a tele-operation station with a screen to display the output of vehicle-mounted cameras and similar controls to those found in the vehicle cab to operate the vehicle. The teaching should not require the operator to perform any actions in addition to those actions required to normally operate the vehicle 10 from the cab, with the exception of starting the data logging system before commencing the route and stopping the data logging system after completing the route. Route Profiling: The present system includes a route profiling method to create a route profile of a passageway environment from one or more logs. A log is a file on a mass storage device accessible by the vehicle's computer processor 26, which contains time-stamped sensor readings that were recorded during a teaching run along the route. Referring to FIG. 4, the profiling method is used to process the raw sensor data contained in the log file into a route profile which is comprised of a vehicle path 1, a sequence of local metric submaps 2 located along and defined relative to the path, and a speed profile 3 defined as a function of the distance along the path.

Referring to FIG. 4, the path 1 itself is determined using the logged data from the odometric sensors and a kinematics model. In one embodiment, wherein the vehicle is a centre-articulated load-haul-dump vehicle, a hinge angle sensor and wheel odometer may be used to estimate the vehicle's hinge angle rate and translational speeds, respectively. The kinematics model consists of a mathematical relationship (i.e., an ordinary differential equation) that relates the logged hinge angle rate and translational speed to the position and orientation of the vehicle, as expressed in a frame of reference (FIG. 4). The path itself is a contiguous set of points visited by a reference point on the vehicle during movement. Due to the nature of wheeled vehicles, the path is always tangent to the direction of vehicle motion. This approach to determining the vehicle path can be classified as "dead-reckoning". Small errors in the estimation of the hinge angle rate and vehicle speed as well as wheel slip and skidding will introduce a drift in the estimate of vehicle position and orientation as compared to reality. In other words, the real path and the estimated path can conceivably diverge. This drift would be problematic if a global map of the environment were sought, whereby a more sophisticated approach would be needed to determine the vehicle path. As will be discussed below, the current application does not seek to determine a globally consistent representation of the passageway environment (i.e., properly closing loops). Rather, local metric submaps are attached along the path, ensuring that if there are small errors in the path (or even large errors over long paths) that the performance of the invention will be unaffected.

Referring to FIG. 4, the local metric submaps 2 are determined using both the odometric sensor data and the rangefinder sensor data. The current application discloses a different method of representing a map of the passageway environment than has been done before, using the sequence of local metric submaps, which better represents the raw shape of the passageways and can offer better vehicle localization in a passageway environment than other systems that use topological representations. And, although metric maps are used, it is a sequence of these maps attached along the vehicle's path that forms the overall route profile; which is to say, the system does not rely on one monolithic map and an absolute frame of reference in which to express maps. The distinction to be made here is that the path is expressed in a particular frame of reference, but the local metric submaps are expressed relative to the path rather than being expressed in a particular frame of reference. This approach is far more flexible than a system that must recognize tunnel topology in that it will work regardless of the shape of the walls, so long as the local metric maps are of sufficient resolution. In one embodiment, the local submaps are grids of cells, wherein each cell takes on a value of either 'occupied' or 'not occupied'. A cell is assigned to be 'occupied' if the region of the passageway environment represented by the cell contains an obstacle, such as a wall or other object. A cell is assigned to be 'not occupied' if the region it represents contains free space that is possibly traversable by the vehicle. This type of submap is sometimes called an occupancy grid. In this case, the resolution of the cells is at the centimeter scale. For each local submap, the laser rangefinder sensor readings logged while the vehicle was on the segment of the path contained within the boundary of the local submap are used to determine the cell values for the local submap. This is done through the use of a standard ray-tracing algorithm to mark those cells from the vehicle position out to the measured rangefinder reading as 'not occupied' and cells a short distance beyond as 'occupied'. A tally is taken of the cell values over all the laser data used for each local submap and the final cell value determined by using the most common value for that cell. This approach allows an arbitrarily shaped environment to be represented. Passageways are particularly well represented using this approach but there is no need to restrict the type of environment to only passageways. Note that if the path is such that in reality it crosses itself (e.g., a closed loop or backtracking due to a direction switch) it is possible for two local submaps to represent the same portion of the environment. This is because we are not required to create a globally consistent map. Such a globally consistent map might be needed for other applications beyond the scope of the current application, including higher-level functions such as path-planning of a vehicle or traffic management of a fleet of vehicles. For our purposes, we need only create a sequence of local submaps along the path, thereby eliminating the need to solve the much more difficult problem of creating a single globally consistent map to represent the entire passageway environment. Finally, the spacing and boundaries of the sequence of local metric submaps are constructed using knowledge of the sensing range of the rangefinder sensors and such that there is sufficient overlap in the regions expressed by contiguous local metric submaps. This is to ensure, when the vehicle switches from one map to the next, that data from its one or more rangefinder sensors always lie within the boundary of a local metric submap.

Referring to FIG. 4, the last major component of the route profile is the speed profile 3. The speed profile serves to provide the target speed for the vehicle during playback at all points along the path. This is necessary to ensure the vehicle slows down along certain portions of the path including approaching direction switches, turns, and approaching the end of the path.

The speed profile is generated automatically to suit the particular vehicle path using preprogrammed rules. High speeds are assigned to sections of the path that are relatively straight. Lower speeds are assigned to sections of the path with higher curvature such that during playback the vehicle will slow down in corners. In one embodiment, the curvature of the path is estimated using the kinematics model described above and the logged vehicle hinge angle along the path. Lower speeds can also be assigned to sections of the path that come close to the wall. The wall distance can be determined by the logged laser rangefinder data along the path. The speed profile is constructed so as to provide smooth accelerations from a stop and smooth decelerations to a stop.

In one embodiment, the speed profile also contains information pertaining to which transmission gear the vehicle should be using at each point on the path. If present in the log, information pertaining to RFID tags and communication infrastructure can also be included in the route profile all expressed as functions, of distance along the path.

Figure 5:
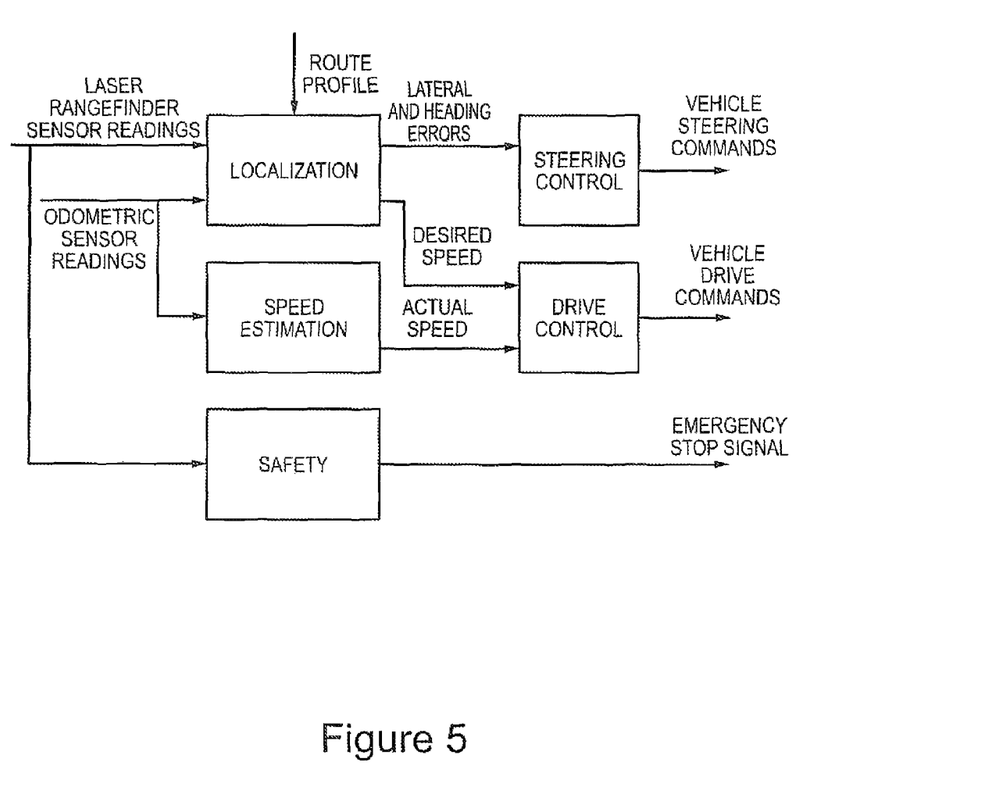
FIG. 5 shows the architecture of the playback control system.

The route profiling method could be executed using the on-board computer or the data log file could be moved to an off-board computer for processing and the resulting route profile file returned to the on-board computer memory for playback. Playback: Once a route has been taught using the teaching method described above and processed into a route profile using the route profiling method described above, the system is ready to play back the route. This is accomplished by way of a playback control system as depicted in FIG. 2. The architecture of the playback control system is depicted in FIG. 5. It is comprised of a localization method, a speed estimation method, a steering control method, a drive control method, and a safety method. Each of these steps serves an important function in the overall control system and each shall be described in detail below. It should be made clear that all of the collection of steps in the playback control system is executed repeatedly, at a high frequency (e.g., 10 to 100 times per second). This is necessary to quickly react to problems and ensure the vehicle plays back the route profile well. This requires that the sensor readings are acquired from the sensors at this high frequency and that the steering and drive commands sent to the vehicle are acted upon (by the vehicle) at this high frequency. We will refer to one cycle of acquiring sensor readings, carrying out all the steps in the playback control system, and sending the steering and vehicle commands to the vehicle as an iteration of the control system. Before the detailed descriptions, an overview of the architecture will be provided.

The first step is to use the localization method to determine where the vehicle is relative to the path contained in the route profile. This includes estimating the longitudinal distance along the path and the lateral and heading errors with respect to the path. When the vehicle is perfectly on the path and oriented so as to be parallel to the path's tangent, the lateral and heading errors are said to be zero. If the vehicle is slightly to one side of the path or the other, the lateral error is either positive (left) or negative (right). If the vehicle is slightly rotated with respect to the path's tangent, the heading error is either positive (anti-clockwise) or negative (clockwise). The lateral and heading errors determined by the localization method are passed to the steering control method. The localization method also serves to look up the desired speed for the vehicle using the estimate of its longitudinal position relative to the path (i.e., how far the vehicle is along the path). The desired speed is passed to the drive control method. The speed estimation method serves to measure the actual speed of the vehicle using sensors and pass this speed estimate to the drive control method. The drive control method compares the actual speed to the desired speed and adjusts the drive commands sent to the vehicle so as to make the difference between the actual and desired speeds as small as possible. The steering control method adjusts the steering commands sent to the vehicle so as to make the lateral and heading errors as small as possible. The safety method acts as an independent check by looking for obstructions along the vehicle path and sending an emergency stop signal to the vehicle if such an obstruction is detected. Details of how all these steps are accomplished will now be provided, broken down by the main blocks of the playback control system architecture. Localization As mentioned above, the task of the localization method is to determine where the vehicle is relative to the path contained in the route profile. This includes estimating the longitudinal distance along the path and the lateral and heading errors with respect to the path. This is accomplished using the odometric sensors for dead-reckoning and rangefinder sensors for correcting said dead-reckoning using the local metric submaps located along the vehicle path in the route profile.

Figure 6A:
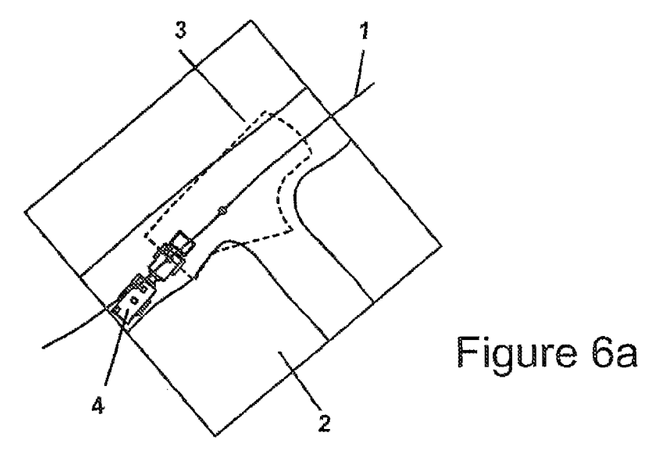
FIGS. 6*a* and 6*b* show how the rangefinder data is used to help determine the position and orientation of the vehicle with respect to the desired path.
Figure 6B:
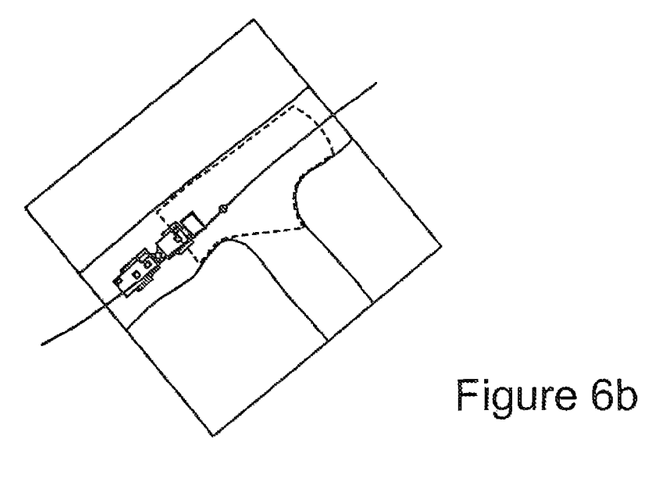

A dead-reckoned estimate of the vehicle's position and orientation is determined using odometric sensors and a kinematics model for the vehicle, in a manner similar to that used for estimating the vehicle path described in the section on route profiling above. In one embodiment, wherein the vehicle is a centre-articulated load-haul-dump vehicle, a hinge angle sensor and wheel odometer may be used to estimate the vehicle's hinge angle rate and translational speeds, respectively. The kinematics model comprises a mathematical relationship (i.e., an ordinary differential equation) that relates the logged hinge angle rate and translational speed to the position and orientation of the vehicle, as expressed in a frame of reference (FIG. 4). Small errors in the estimation of the hinge angle rate and vehicle speed as well as wheel slip and skidding will introduce a drift in the estimate of vehicle position and orientation as compared to reality. Acting alone, the real position/orientation and the dead-reckoned position/orientation can conceivably diverge. For this reason, the predictions of position/orientation made by the dead-reckoning method must be corrected so as to bound the errors. Corrections to the dead-reckoned estimate are made using the local metric submaps located along the path in the route profile and the sensor readings from the laser rangefinders. The dead-reckoned estimate serves as an initial guess for the position/orientation of the vehicle with respect to the path. A correction method starts with this initial guess and refines it so as to ensure the sensor readings from the laser rangefinder are well-matched to the currently active local metric submap. This scenario is depicted in FIGS. 6a and 6b, wherein the laser rangefinder sensor readings 3 have been aligned to the local metric submap 2. Because the local metric submap is defined with respect to the vehicle path 1 of the vehicle 4, it is a simple matter of geometry to determine the position and orientation of the vehicle with respect to the path. Referring to the example in FIG. 6b, we can see the (corrected) vehicle estimate is reasonably parallel to the path but shifted to the left of the path. Typically the vehicle will have two laser rangefinders, one pointing forwards and one pointing backwards. In one form of the invention, only the laser rangefinder pointing in the direction of current movement is used to correct the vehicle position/orientation. In another form of the invention, both laser rangefinders are used.

There are many techniques available in the published literature by which the alignment of the laser rangefinder sensor readings to the local metric submap may be accomplished. In the preferred embodiment of the invention, a technique that tries to minimize the weighted sum of squared errors is employed. The squared error for an individual laser rangefinder range measurement is the square of the difference between the measured range and the expected range. The sum of squared errors is this quantity, summed over all the range measurements. A weighted sum of squared errors places more weight on some of the range measurements than others by considering the uncertainty associated with the individual sensor readings. The expected range is the range one would expect to measure from the dead-reckoned estimate of the vehicle position and orientation, using the local metric submap and a ray-tracing algorithm to probe along the scan line. The ray-tracing algorithm steps along the scan line outwards from the vehicle's rangefinder sensor location in the scan direction in small increments until an occupied grid cell is found on the local metric submap. The expected range is the distance from the vehicle's rangefinder sensor to the occupied grid cell. In one embodiment, the popular Iterative Closest Point algorithm is used to perform the alignment. In another embodiment, a particle filter is used to perform the alignment. In a third embodiment, a Kalman filter is used to perform the alignment. The identity of the currently active local metric submap is determined using the longitudinal position of the vehicle from the previous iteration of the control system (as defined in the playback overview above). A handoff scheme is used to ensure the system progresses through the sequence of local metric submaps as the vehicle moves along the path. Speed Estimation: The speed estimation method serves to measure the actual translational speed of the vehicle using sensors and passes this speed estimate to the drive control method. In one embodiment, referring to FIG. 1, a wheel encoder 30 is used to estimate the vehicle's longitudinal speed. In one embodiment, the wheel encoder 30 is mounted on the wheel axle. In another embodiment, the wheel encoder 30 is mounted on the drive shaft. In a third embodiment, the wheel encoder 30 is mounted on its own shaft equipped with a wheel and is held against the vehicle wheel using a spring. Regardless of the embodiment, the speed is estimated by first estimating the distance traveled and then differentiating this signal. The distance traveled is estimated by multiplying the number of encoder revolutions by a calibrated factor. The calibrated factor is determined by driving the vehicle a known distance (as measured using, for example, a tape measure) in a straight line and dividing this distance by the number of resulting wheel encoder turns.

The distance traveled is turned into a speed measurement using a differentiator. The differentiator takes the distance traveled over a short time interval and divides by this time interval. In one embodiment a filter is used to smooth out the speed estimate, which will inevitably be noisy due to the quantization introduced by the encoder and the time interval. The speed estimate is positive for forwards tramming and negative for backwards tramming. The estimated speed is passed to the drive control method for comparison with the desired speed.

Drive Control: The drive control method is used to regulate the speed of the vehicle, similarly to the cruise control function in a standard automobile. The inputs required by the drive control method are an estimate of the vehicle's actual speed, which is provided by the speed estimation method described above, and the desired speed of the vehicle at the current distance along the path, which is provided by the localization method. The first step in this method is to compute the speed error, which is the difference of the desired vehicle speed and the actual vehicle speed. If the desired speed and the actual speed are the same, the speed error is zero. The drive control method then uses this speed error to alter the drive commands being sent to the vehicle.

For a typical mining vehicle, such as a load-haul-dump vehicle, the drive commands are comprised of throttle brake, and possibly the transmissions gear. A standard controller is used to update the drive commands based on the current speed error. In one embodiment, a gear-switching logic and a standard proportional-integral-derivative (PID) controller is used to update the drive commands based on the current speed error. The PID controller is derived based on knowledge of the vehicle's driveline dynamics including such components as engine dynamics, transmission and gear switching dynamics, torque converter dynamics, vehicle translational dynamics, passageway grade (as sensed by inclinometers), driveshaft-axle dynamics, and wheel-ground interaction dynamics. Knowledge of these dynamics is based on vehicle specifications and system identification. Key controller parameters, known as controller gains, can be adjusted once the drive control method is executing on the vehicle, so as to achieve the desired response of the vehicle to a change in the desired speed. For example, the desired speed should be tracked as quickly as possible without the actual speed overshooting the desired speed. Steering Control The steering control method adjusts the steering commands sent to the vehicle so as to make the vehicle track the path defined in the route profile as closely as possible. This is accomplished by first receiving the lateral and heading errors from the localization method, as described above. When the vehicle is perfectly on the path and oriented so as to be parallel to the path's tangent, the lateral and heading errors are said to be zero. If the vehicle is slightly to one side of the path or the other, the lateral error is either positive (left) or negative (right). If the vehicle is slightly rotated with respect to the path's tangent the heading error is either positive (anti-clockwise) or negative (clockwise). The role of the steering control method is to use these lateral and heading errors to adjust the steering commands sent to the vehicle. For a typical mining vehicle, such as a load-haul-dump vehicle, the steering commands are comprised of a signal sent to a proportional hydraulic valve which in turn causes hydraulic cylinders to actuate the hinge joint. A path-tracking controller is used to update the steering commands based on the current lateral and heading errors. The path-tracking controller is derived based on knowledge of the vehicle's steering kinematics and dynamics including such components as hydraulic dynamics (i.e., steering valve, steering cylinders, hydraulic pump, pressure relief valves), vehicle rotational dynamics, and wheel-ground interaction dynamics. Knowledge of these kinematics and dynamics is based on vehicle specifications and system identification. Key controller parameters can be adjusted once the steering control method is executing on the vehicle so as to achieve the desired response of the vehicle when tracking a path. For example, the vehicle should not oscillate or wobble about the path and should not take turns too widely.

Safety: The safety method acts as an independent check by looking for obstructions along the vehicle path and sending an emergency stop signal to the vehicle if such an obstruction is detected. This is accomplished by monitoring the sensor readings from the laser rangefinders, particularly from the sensor pointing in the direction of travel of the mining vehicle. In one form of the invention, a fixed region is defined relative to the vehicle a distance ahead of the vehicle and any laser rangefinders sensor readings that fall within this region indicate an obstruction. In another form of the invention, a dynamic region is used wherein the vehicle looks further ahead along the path for obstructions when its speed is higher. In another form of the invention, an obstruction is indicated when the actual laser rangefinder sensor readings and the expected laser rangefinder sensor readings, as determined using the local metric submap, differ by a predetermined amount. Refer to the description of the localization method, above, for details on determining the expected laser rangefinder sensor readings. In all embodiments, an emergency stop signal is sent to the vehicle in the event an obstruction is detected, which should fully engage the brakes, set the throttle to zero, and put vehicle in neutral.

The safety method could be considered part of an overall safety system for autotramming. Although this safety method provides an independent check, additional measures such as looking for the presence and/or absence of signals arising from RFID tags/readers and/or communication infrastructure access points can help to confirm the position/orientation information generated by the localization method described herein.

CONCLUSION

The guidance, navigation, and control system for a mining vehicle disclosed herein is very advantageous because of its ability to enable operatorless and infrastructureless tramming through underground passageways, thereby reducing the risk and cost of tramming when compared to manual operations.

As used herein, the terms "comprises", "comprising", "including" and "includes" are to be construed as being inclusive and open-ended. Specifically, when used in this document, the terms "comprises", "comprising", "including", "includes" and variations thereof, mean the specified features, steps or components are included in the described invention. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

We claim:

1. A method for automating the operation of a self-propelled vehicle in a passageway environment, the vehicle including one or more odometric sensors, one or more rangefinder sensors mounted on said vehicle, and a microprocessor including memory storage, said one or more odometric sensors and one or more rangefinder sensors being connected to said microprocessor, said vehicle being configured for microprocessor controlled operation with said microprocessor being interfaced with the vehicle's throttle/engine system, transmission system, braking system, and steering system, said method including the steps of:
  a) teaching a vehicle path through said passageway environment by the steps of,
    i) conducting a training run of said vehicle path through said passageway environment by driving said vehicle through said passageway environment, and
    ii) acquiring raw sensor data from said one or more odometric sensors and said one or more rangefinder sensors during said training run of said vehicle path and storing said raw sensor data in a log file in said microprocessor memory storage;
  b) processing said raw sensor data contained in said log file and producing therefrom a route profile and storing said route profile in said microprocessor memory storage, said route profile including
    i) information representing a vehicle path through said passageway environment,
    ii) a sequence of local metric submaps of said passageway environment along said vehicle path, and
    iii) a speed profile defined as a function of distance along the vehicle path; and
  c) automatically driving said vehicle along said vehicle path by the steps of,
    i) determining longitudinal, lateral, and heading errors of said vehicle with respect to the vehicle path by comparing said raw sensor data from said odometric sensors and said rangefinder sensors to said local metric submaps and said microprocessor using said longitudinal, lateral and heading errors and knowledge of said vehicle's dynamics to control said steering system to adjust a direction of travel of said vehicle if needed for ensuring said vehicle closely tracks said vehicle path from said information representing said vehicle path stored in said route profile,
    ii) estimating a speed of said vehicle from data from said odometric sensors, and said microprocessor controlling said throttle/engine system, transmission system, and a braking system to adjust speed of travel of said vehicle if needed for ensuring said vehicle closely tracks said speed profile stored in said route profile by using said estimated speed and knowledge of said vehicle's dynamics, and
    iii) said microprocessor instructing said vehicle to stop in the event of an emergency situation arising.

2. The method according to claim 1 wherein said information representing said vehicle path is generated by using said raw sensor data from the odometric sensors and a kinematics model of the vehicle.

3. The method according to claim 1 wherein said sequence of local metric submaps are constructed using sensor data from both said one or more odometric sensors and said one or more rangefinders, and wherein said local metric submaps include grids of cells, wherein each cell takes on a cell value of either 'occupied' or 'not occupied' such that a cell is assigned to be 'occupied' if it is estimated that the region of said passageway represented by the cell contains an obstacle, and a cell is assigned to be 'not occupied' if the region of said passageway represented by the cell contains free space that is possibly traversable by said self-propelled vehicle.

4. The method according to claim 3 wherein a spacing and boundaries of said sequence of local metric submaps are constructed using knowledge of the sensing range of said one or more rangefinder sensors and such that there is sufficient overlap in regions represented by contiguous local metric submaps so as to ensure that data from said one or more rangefinder sensors always lie within the boundaries of at least one local metric submap in said sequence of local metric submaps.

5. The method according to claim 3 wherein the cell values for a specified local metric submap in said sequence of local metric submaps are determined by using the sensor readings from said one or more rangefinder sensors logged while the self-propelled vehicle is on a segment of the vehicle path in the passageway environment contained within boundaries of said specified local metric submap.

6. The method according to claim 5 wherein determining the cell values for the local metric submap is done through the use of a ray-tracing algorithm stored in said microprocessor memory storage to mark those cells from the vehicle position out to the measured rangefinder reading as 'not occupied' and cells a short distance beyond as 'occupied', then taking a tally of the cell values over all the laser data used for each local submap and a final cell value determined by using the most common value for that cell.

7. The method according to claim 1 wherein said step of determining longitudinal, lateral, and heading errors of said vehicle with respect to said vehicle path includes estimating a longitudinal distance along the vehicle path and lateral and heading errors of the self-propelled vehicle with respect to the vehicle path using data from said one or more odometric sensors to dead-reckon said vehicle's position and orientation, and using data from said one or more rangefinder sensors for correcting said dead-reckoned vehicle position and orientation using said sequence of local metric submaps located along the vehicle path in the route profile.

8. The method according to claim 7 wherein the step of correcting said dead-reckoned vehicle position and orientation using said sequence of local metric submaps is accomplished by minimizing the error between said data from one or more rangefinder sensors and expected rangefinder data for an appropriately selected set of possible positions and orientations of the vehicle given an estimated location of the vehicle along said vehicle path, as represented in said route profile, as determined by dead-reckoning.

9. The method according to claim 1 wherein said steering system includes a path-tracking controller for updating steering commands based on current lateral and heading errors, wherein said path-tracking controller includes stored knowledge of the vehicle's kinematics and dynamics, including the vehicle's steering kinematics, the vehicle's rotational dynamics, and its steering actuator dynamics.

10. The method according to claim 1 wherein said odometric sensors include either a drive-shaft encoder and a hinge-angle encoder, an inertial measurement unit, or both, and wherein said step of acquiring raw sensor data includes using a data logging means which is configured to record information from said drive-shaft encoder and hinge-angle encoder, said inertial measurement unit, or both.

11. The method according to claim 1 wherein said step of conducting a training run of a vehicle path through said passageway environment by driving said vehicle through said passageway environment includes an operator manually driving the vehicle through said passageway environment, or configuring said self-propelled vehicle for tele-operation and remotely driving the vehicle through said passageway environment.

12. The method according to claim 1 wherein said step of processing said raw sensor data contained in said log file and producing therefrom a route profile which includes said speed profile, includes providing a target speed for the vehicle at all points along the vehicle path wherein said speed profile is generated using a set of preprogrammed rules.

13. The method according to claim 12 wherein said set of preprogrammed rules includes assigning high speeds to sections of the vehicle path that are relatively straight, assigning lower speeds to sections of the vehicle path with a higher curvature such that during automated operation of the vehicle the vehicle will slow down while going around corners, and wherein said speed profile is produced so as to provide smooth acceleration from a stop and smooth deceleration to a stop.

14. The method according to claim 1 wherein said microprocessor is configured such that steps c) i), ii) and iii) are repeated at a sufficiently high frequency to ensure the vehicle plays back the route profile well and reacts to problems such as unexpected obstructions.

15. The method according to claim 14 wherein said sufficiently high frequency is a frequency in a range from about 10 to about 100 times per second.

16. The method according to claim 1 wherein said step of said microprocessor instructing said vehicle to stop in the event of an emergency situation arising includes any one or combination of
  said microprocessor accepting stop signals from one or more external sources,
  said microprocessor generating internal stop signals based on data from said one or more rangefinder sensor(s), and
  said microprocessor generating internal stop signals based on data from said one or more odometric sensor(s).

* * * * *